US009939282B2

(12) United States Patent
Liebinger et al.

(10) Patent No.: US 9,939,282 B2
(45) Date of Patent: Apr. 10, 2018

(54) PROFILE BASED NAVIGATION

(71) Applicant: International Business Machines Corporation, Armonk, NY (US)

(72) Inventors: Franz F. Liebinger, Heredia (CR); Roxana Monge Núñez, San Jose (CR); Juan G. Rodriguez, San Jose (CR); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/190,389

(22) Filed: Jun. 23, 2016

(65) Prior Publication Data
US 2017/0370739 A1 Dec. 28, 2017

(51) Int. Cl.
*G01C 21/00* (2006.01)
*G01C 21/34* (2006.01)
*G06F 17/30* (2006.01)
*H04L 29/08* (2006.01)
*G06Q 50/00* (2012.01)

(52) U.S. Cl.
CPC ... *G01C 21/3484* (2013.01); *G06F 17/30595* (2013.01); *G06F 17/30702* (2013.01); *H04L 67/306* (2013.01); *G06Q 50/01* (2013.01)

(58) Field of Classification Search
CPC .......... G01C 21/3483; G06F 17/30595; G06F 17/30702
USPC ....................................................... 701/522
See application file for complete search history.

(56) References Cited

U.S. PATENT DOCUMENTS

| | | | |
|---|---|---|---|
| 7,532,978 | B2 | 5/2009 | Upparapalli et al. |
| 8,352,179 | B2 | 1/2013 | French et al. |
| 8,467,961 | B2 | 6/2013 | Obradovich et al. |
| 9,053,509 | B2 | 6/2015 | Azose |
| 2015/0260531 | A1 | 9/2015 | Ehsani et al. |
| 2015/0276419 | A1 | 10/2015 | Hashem et al. |
| 2015/0292894 | A1* | 10/2015 | Goddard ............ G01C 21/3492 701/400 |

(Continued)

OTHER PUBLICATIONS

Albert et al., "The role of personality factors in repeated route choice behavior: behavioral economics perspective," European Transport, n. 48 (2011), pp. 47-59, https://www.openstarts.units.it/dspace/.../48D_AlbertToledoBenZion.pdf.

(Continued)

*Primary Examiner* — Muhammad Shafi
(74) *Attorney, Agent, or Firm* — Kristofer L. Haggerty

(57) ABSTRACT

A computer generates a navigation profile corresponding to a user by identifying one or more user preferences within an associated social media network. The computer receives a user input identifying a starting location and a destination, from which the computer identifies one or more potential routes between the starting location and destination. The computer generates one or more route profiles corresponding to the one or more potential routes detailing one or more characteristics associated with each of the potential routes. The computer then compares the navigation profile associated with the user to the route profiles associated with the one or more potential routes and, based on the comparison, determines an optimal route of the one or more potential routes.

6 Claims, 5 Drawing Sheets

(56) References Cited

U.S. PATENT DOCUMENTS

2016/0071056 A1* 3/2016 Ellison ............ G06Q 10/08355
                                                        705/338
2016/0123743 A1* 5/2016 Sisbot ................ G01C 21/3461
                                                        701/538
2016/0196756 A1* 7/2016 Prakash ................ B64C 39/024
                                                        701/3

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

PROFILE BASED NAVIGATION

BACKGROUND

The present invention relates generally to navigation systems, and more particularly to customizing navigation for a user based on user preferences found in an associated user profile. The use of navigation systems is extremely common in not only commuting to a destination for which the route is unknown, but also in determining the optimal route to a destination based on factors such as traffic and time. While many navigation systems will, by default, select an optimal route based on total commute time, there is often times a need for a navigation system to take other factors into account when determining the optimal route.

SUMMARY

Embodiments of the present invention disclose a method, system, and computer program product for a profile based navigation system. A computer generates a navigation profile corresponding to a user by identifying one or more user preferences within an associated social media network. The computer receives a user input identifying a starting location and a destination, from which the computer identifies one or more potential routes between the starting location and destination. The computer generates one or more route profiles corresponding to the one or more potential routes detailing one or more characteristics associated with each of the potential routes. The computer then compares the navigation profile associated with the user to the route profiles associated with the one or more potential routes and, based on the comparison, determines an optimal route of the one or more potential routes.

DETAILED DESCRIPTION

Embodiments of the present invention will now be described in detail with reference to the accompanying figures.

Figure 1:
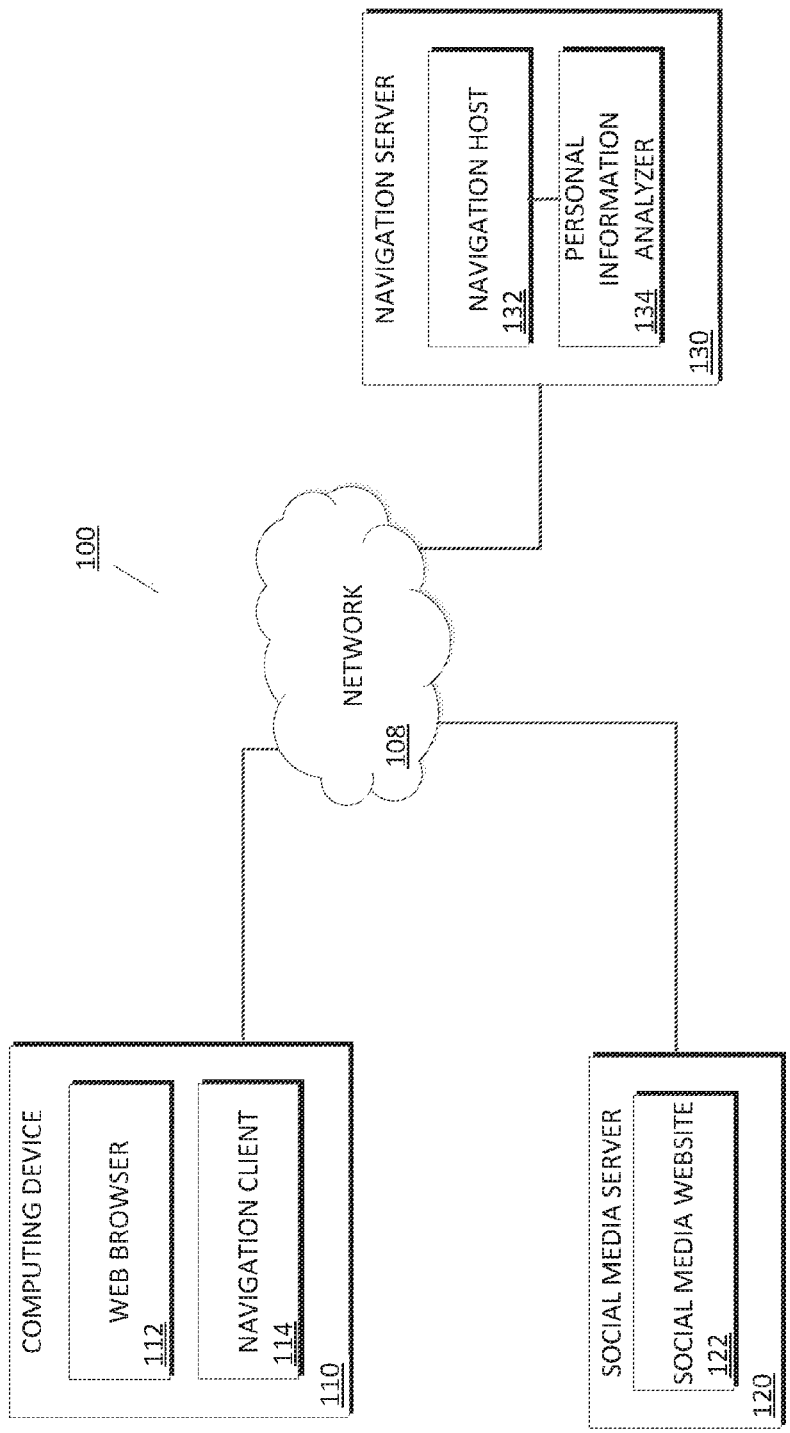
FIG. 1 illustrates a profile based navigation system 100, in accordance with an embodiment of the present invention.

FIG. 1 illustrates a profile based navigation system 100, in accordance with an embodiment of the invention. In the example embodiment, profile based navigation system 100 includes computing device 110, social media server 120, and navigation server 130, all interconnected via network 108.

In the example embodiment, network 108 may be the Internet, representing a worldwide collection of networks and gateways to support communications between devices connected to the Internet. Network 108 may include, for example, wired, wireless, or fiber optic connections. In other embodiments, network 108 may be implemented as an intranet, a local area network (LAN), or a wide area network (WAN). In general, network 108 can be any combination of connections and protocols that will support communications between computing device 110, social media server 120, and navigation server 130.

In the example embodiment, computing device 110 includes web browser 112 and navigation client 114. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. In the example embodiment, computing device 110 includes a Global Positioning System (GPS) module capable of identifying coordinate locations detailing the location of computing device 110. Computing device 110 is described in more detail with reference to FIG. 3.

In the example embodiment, web browser 112 is program application on computing device 110 utilized to access information over a network, such as network 108. In the example embodiment, the user of computing device 110 utilizes a user interface on web browser 112 to access websites, such as social media website 122, and enter user input.

Navigation client 114 is a client program application on computing device 110 which communicates with a host program on a host server, such as navigation host 132 on navigation server 130. In the example embodiment, navigation client 114 acts as a user interface to the user of computing device 110 to communicate with navigation host 132 and includes capabilities such as receiving user input and displaying maps/directions.

In the example embodiment, social media server 120 includes social media website 122. In the example embodiment, social media server 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While social media server 120 is shown as a single device, in other embodiments, social media server 120 may be comprised of a cluster or plurality of computing devices, working together or working separately. Social media server 120 is described in more detail with reference to FIG. 3.

Social media website 122 is a collection of files including, but not limited to, for example, HTML files, CSS files, XML files, image files and JavaScript files. Social media website 122 can also include other resources such as audio files and video files. In the example embodiment, social media website 122 is a social media website such as Facebook® (Facebook is a registered trademark of Facebook, Inc.), Twitter® (Twitter is a registered trademark of Twitter, Inc.), LinkedIn® (LinkedIn is a registered trademark of LinkedIn Corporation), or Instagram® (Instagram is a registered trademark of Instagram, LLC). Additionally, in the example embodiment, social media website 122 stores profile and user interaction information of registered users.

In the example embodiment, navigation server 130 includes navigation host 132 and personal information analyzer (PIA) 134. In the example embodiment, navigation server 130 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While navigation server 130 is shown as a single device, in other embodiments, navigation server 130 may be comprised of a cluster or plurality of computing devices, working together or working separately. Navigation server 130 is described in more detail with reference to FIG. 3.

In the example embodiment, navigation host 132 is a host program application on navigation server 130 which communicates with navigation client 114 on computing device 110. Furthermore, in the example embodiment, navigation host 132 communicates with global position systems and other information sources, such as maps, to provide real-time directions to user-input destinations based on time and location information, similar to Google Maps® (Google Maps is a registered trademark of Google Incorporated).

In the example embodiment, personal information analyzer (PIA) 134 is a program application on navigation server 130 which is integrated with navigation host 132. In the example embodiment, PIA 134 is capable of scanning the social network profile of a user to identify factors indicative of characteristics such as personality traits, medical conditions, and general mood. PIA 134 is further capable of generating and updating a navigation profile of the user detailing the identified factors. In the example embodiment, PIA 134 is additionally capable of detecting a user input received by navigation host 132 which details a destination and further capable of identifying the potential routes to the destination determined by navigation host 132. Based on the navigation profile of the user and the identified potential routes, PIA 134 is further capable of calculating route values for each of the potential routes and, based on comparing the navigation profile to the route values, determining an optimal route for the user.

Figure 2:
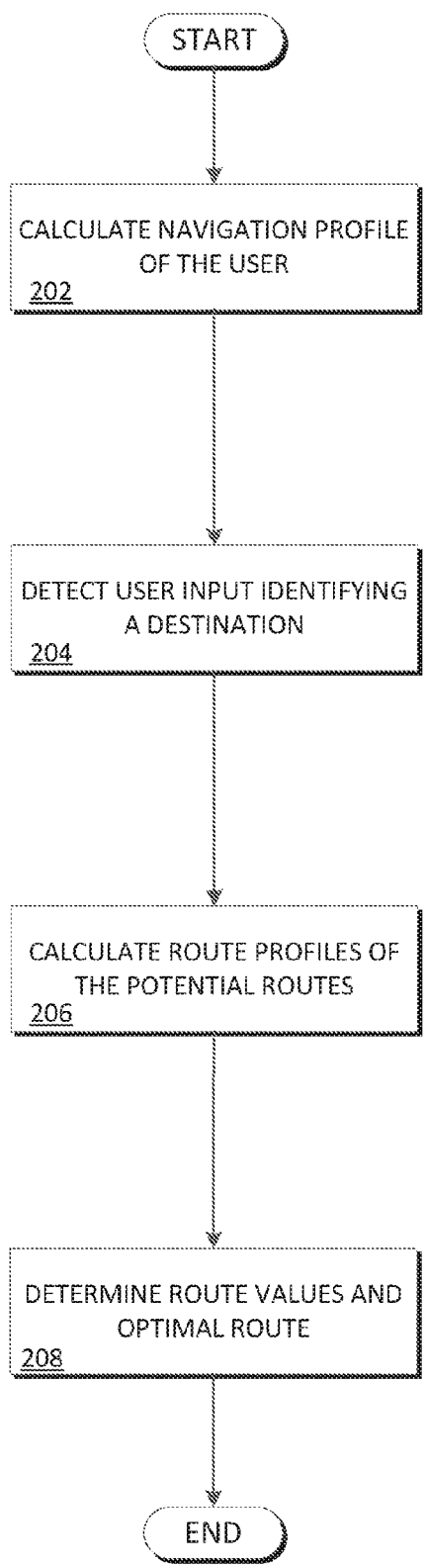
FIG. 2 is a flowchart illustrating the operation of the personal information analysis (PIA) program of FIG. 1 in determining an optimal route to a destination for a user based on the profile of the user.

FIG. 2 is a flowchart depicting the operation of PIA 134 in determining an optimal route for a user to reach a destination based on the social media profile of the user.

With reference to FIG. 2, PIA 134 calculates a navigation profile of the user (step 202). In the example embodiment, a navigation profile details user preferences, or factors, expressed in the social media network of a user as well as the positive, negative, or neutral contexts with which those user preferences are expressed. This navigation profile is later compared to potential routes to a destination to determine an optimal route. In the example embodiment, PIA 134 generates a navigation profile for a user by first identifying user preferences detailing the user within social media networks. In the example embodiment, PIA 134 identifies the social media profile(s) corresponding to a user by monitoring web browser 112 on computing device 110 for the logging in to social media website 122. Upon detection of the user logging in to social media website 122, PIA 134 stores the social media profile location, such as a web address, and stores the location in association with the user. In other embodiments, PIA 134 may identify a social media network associated with the user by other means, such as via user input or searching social media networks for a name of the user registered to computing device 110. Having identified one or more social media networks associated with the user, PIA 134 identifies user preferences included in the social media networks. Such user preferences may include, for instance, personality traits, medical conditions, and the mood of the user. PIA 134 identifies said user preferences by utilizing word processing techniques, such as natural language processing and optical character recognition, to search the social media network of the user for words and/or phrases contained in a relational database. In the example embodiment, PIA 134 searches for user preferences within the social media network of the user in multiple places, such as a user profile listing interests, likes, associations, communities, organizations, and charitable interests, as well as recent activity of the user detailing posts, comments, likes, discussions, and participation in events. In the example embodiment, the relational database of keywords details user traits, related terms, and synonyms which relate to travel and comfort of a user. If PIA 134 determines that a word/phrase within the relational database matches a word/phrase within the social media network of a user, the word/phrase or an associated keyword is stored in association with the user.

For example, if the relational database contains the keyword "crowded" and user Alpha posts on social media that "the bar is too crowded," then PIA 134 identifies the keyword "crowded" and associates the keyword "crowded" with navigation profile of user Alpha. Similarly, if the relational database contains the keyword "heights" and user Alpha lists "heights" as a fear within the social media profile of user Alpha, then PIA 134 associates the keyword "heights" with the navigation profile of user Alpha. Lastly, if the relational database contains the keyword "sunlight allergies" and user Alpha posts that "sunlight allergies are acting up," then PIA 134 associates the keyword "sunlight allergies" with the navigation profile of user Alpha.

In addition to storing keyword associations within the navigation profile of a user, PIA 134 also stores a context, or favorability, with which the keywords were used (step 202 cont'd). In this second and last step of generating a navigation profile, PIA 134 utilizes techniques such as natural language processing to determines whether the identified keywords are used in a positive, negative, or neutral context. For example, the keyword "crowded" (or synonym "busy") may be associated with the medical condition claustrophobia when used in a negative context, however "crowded" may also be associated with a mood or personality trait when used in a positive context, such as being outgoing or an avid patron of crowded bars. While it is not necessary to determine whether a user actually is claustrophobic, PIA 134 does determine whether the user is fond of or dislikes crowds so PIA 134 can route commutes accordingly. In the example embodiment, PIA 134 attempts to characterize each identified keyword as a positive, neutral, or negative keyword (with regards to the user) depending on the surrounding context within a threshold distance. In the example embodiment, PIA 134 determines whether a keyword has a positive, neutral, or negative context by analyzing the words and phrases within a threshold distance of the identified keyword, for example five words. Within the surround context/words, PIA 134 determines a positive/neutral/negative context via identifying contradictory language, such as "not," and other verbiage indicative of a positive or negative association, such as "love," "hate," and even phrases such as "too much" or "not enough." PIA 134 then utilizes natural language processing techniques to establish positive, neutral, or negative context in which the keyword is used. In the example embodiment, degrees of positivity and negativity may be configured by a user such that certain words and context carry more positive/negative weight. For example, the weight applied to a keyword near the term "love" may carry more weight than a keyword near the term "like."

Continuing the example above where PIA 134 identified the keyword "crowded" within the social media post by Alpha, "the bar is too crowded," if PIA 134 determines that the word "too" is within five words of the identified keyword "crowded" in the absence of contradictory language such as "not," PIA 134 stores a negative association with "crowds" in the navigation profile of user Alpha. Alternatively, had Alpha posted that "the bar is not crowded enough," then PIA 134 identifies the contradictory language "not" within five words of the terms "crowded" and "enough." PIA 134 then utilizes natural language processing techniques to infer (and store) a positive association with the keyword "crowds" within the navigation profile of user Alpha. In some embodiments which apply greater or less weight to a keyword based on the surrounding context, if Alpha had posted that "I dislike when bars are this crowded" and the term "dislike" carries a weight of −3 (negative three) on a scale of +5 (strongly like) to −5 (strongly dislike) with 0 being neutral, then PIA 134 associates a −3 with "crowds" in the navigation profile of user Alpha. Similarly, if Alpha posted "I hate when my sunlight allergies act up" and the term "hate" carries a weight of −5, then PIA 134 associates a −5 with "sunlight allergies" in the navigation profile of user Alpha.

PIA 134 detects a user input received by navigation host 132 via integration with navigation host 132 (step 204). In the example embodiment, the user input is received by navigation host 132 and includes a user identification, a destination, commute preferences, and, in some embodiments, a starting location. In the example embodiment, navigation host 132 identifies a user via credential authentication, such as by inputting a username and password, and receives a destination, such as a building, street, or landmark, via user input. Additionally, navigation host 132 determines a starting location of the user either by receiving user input or accessing a global positioning module within computing device 110. Lastly, navigation host 132 receives user preferences detailing preferred routes, including options such as avoiding tolls, avoiding highways, etc. Based on the aforementioned information, navigation host 132 determines several potential routes, including options for several different modes of transportation, from the starting location to the desired destination, which PIA 134 monitors and records via integration. In other embodiments, PIA 134 may be capable of also performing the functions of both navigation client 114 and navigation host 132.

Continuing the example above, if user Alpha inputs destination, D, into navigation client 114 and navigation host 132 calculates routes A, B, and C to destination D, then PIA 134 extracts routes A, B, and C from navigation host 132 via integration.

PIA 134 determines route profiles associated with each of the potential routes (step 206). Similar to how PIA 134 determines degrees of positive and negative association with each of the user preferences making up a user navigation profile above, PIA 134 also determines a route profile detailing positive and negative traits associated with each of the characteristics corresponding to the potential routes. In the example embodiment, characteristics are associated with a potential route, and segments thereof, via both data learning techniques and user input. For example, PIA 134 may determine the crowdedness of a subway via referencing public transportation databases detailing an amount of people who paid (or used a turnstile) for a particular subway ticket between 8:00 AM and 9:00 AM on a Tuesday. Furthermore, the weights applied to the keyword "crowds" can be tiered into brackets such that an average crowd is assigned a neutral weight of 0 while crowds beyond a certain threshold amount is assigned a weight of +1, crowds beyond a greater threshold area assigned a +2, and so forth. In another example, PIA 134 may determine sunlight exposure (in regards to user allergies) to a user along a potential route via referencing weather forecasts and maps to determine the outdoor distances between connection points along a potential route. Similarly, based on a referenced ultraviolet index, distance calculation, or combination of both, the keyword "sunlight allergies" may be applied varying weights as well. For characteristics of other factors which are unascertainable by PIA 134, a user may indicate characteristics corresponding to a factor via user input, such as inputting that a particular bus trip route is bumpy or particular flight experiences large amounts of turbulence.

Continuing the example above, if Route A is moderately crowded and Route B exposes a user to large amounts of sunlight on the particular day that user Alpha is traveling, then PIA 134 assigns route A "crowds" weight of +2 and route B a "sunlight allergies" weight of +5.

PIA 134 calculates route values corresponding to the potential routes identified by navigation host 132 and determines an optimal route for the user (step 208). In the example embodiment, route values detail the overall applicability of each potential route with regard to a user and are based on the cumulative value of individual factor values. In the example embodiment, individual factor values correspond to each factor, such as crowds, within a navigation profile and/or route profile and are determined by comparing the factors of the navigation profile of a particular user calculated in step 202 to the factors of the route profile associated with a particular route calculated in step 206 (or segments thereof). In the example embodiment, the factor values are then summed to determine a route value corresponding to the user and that particular route. When applicable, PIA 134 takes into consideration the weights applied to the compared factors such that a best overall route is chosen. In the example embodiment, PIA 134 determines factor values by determining the difference between the weight applied to a factor in the navigation profile of the user to the weight applied to a factor in the route profile of a route. The greater the difference, the less favorable the factor on this particular route is to the user. Conversely, the less the difference, the more favorable the factor on this particular route is to the user.

Moreover, in the example embodiment, PIA 134 may consider additional factors in determining an optimal route to a destination, such as commute time, commute distance, highway/city driving, traffic signals, estimated mileage per gallon (MPG), and the like. Such factors, like those above, may be configured and weighted such that after comparing the factor value in the navigation profile to the route profile, favorable factors are indicated with a lower factor value while unfavorable routes are indicated by a higher factor value. Similarly, the resulting factor value is then incorporated into the overall route value for each route. For example, if a route is calculated to take the longest amount of time relative to the other comparable routes, it may be assigned a value of +3 (unfavorable). Similarly, if a route takes longer than it usually does, it may be assigned a value of +3. Conversely, if a route exhibits a better commute time than average or relative to the other comparable commutes, it may be assigned a value of −3. These values are then compared to the traffic factor within the navigation profile of a user, for example −5 for hate, to determine the difference and incorporate the remainder/sum into the route value. In other embodiments, other relative scales and determination techniques may be implemented.

Using the example above where the navigation profile of Alpha weighs the keyword "crowds" at a −3 (dislike), if route A is assigned a "crowds" weight of +2 (moderately crowded), then PIA 134 determines the factor value of crowds on route A to be 5 and an overall route value of 5 (having only considered one factor: crowds). Similarly, continuing the example above where the navigation profile of Alpha weighs the keyword "sunlight allergies" at a −5 (hate), if route B is assigned a "sunlight allergies" weight of +5 (very sunny), then PIA 134 determines a factor value of "sunlight allergies" corresponding to route B of 10 and an overall route value of 10 (only considering the sunlight exposure factor). Considering only crowds along route A and sunlight along route B, PIA 134 determines that route A is the optimal route because it involves less user exposure to an uncomfortable factor. Moreover, PIA 134 may additionally consider other factors. Continuing the example above where user Alpha hates traffic (−5) and PIA 134 considers the traffic factor, if route A is assigned a traffic value of +1 (slight traffic) and route B is assigned a traffic value of −5 (less traffic than average/comparable commutes), then PIA 134 determines a traffic factor value corresponding to route A of 6 and route B of 0. Therefore, considering both crowds and traffic, route A has a route value of 11 (5+6=11). Similarly, considering sunlight exposure and crowds, route B has a route value of 10 (10+0=10). Therefore, when additionally considering traffic in the example above, the optimal route is route B because the corresponding route value of 10 is less than that of route A's route value of 11. This determination can be made for any number of factors and then averaged, scaled, or normalized as seen fit. PIA 134 then instructs navigation host 132 to prompt user selection of a route to the user or automatically select a route for the user, based on the default settings and preferences of the user. In the example embodiment, the determined optimal route is then displayed to the user in the user interface of navigation client 114.

Figure 3:
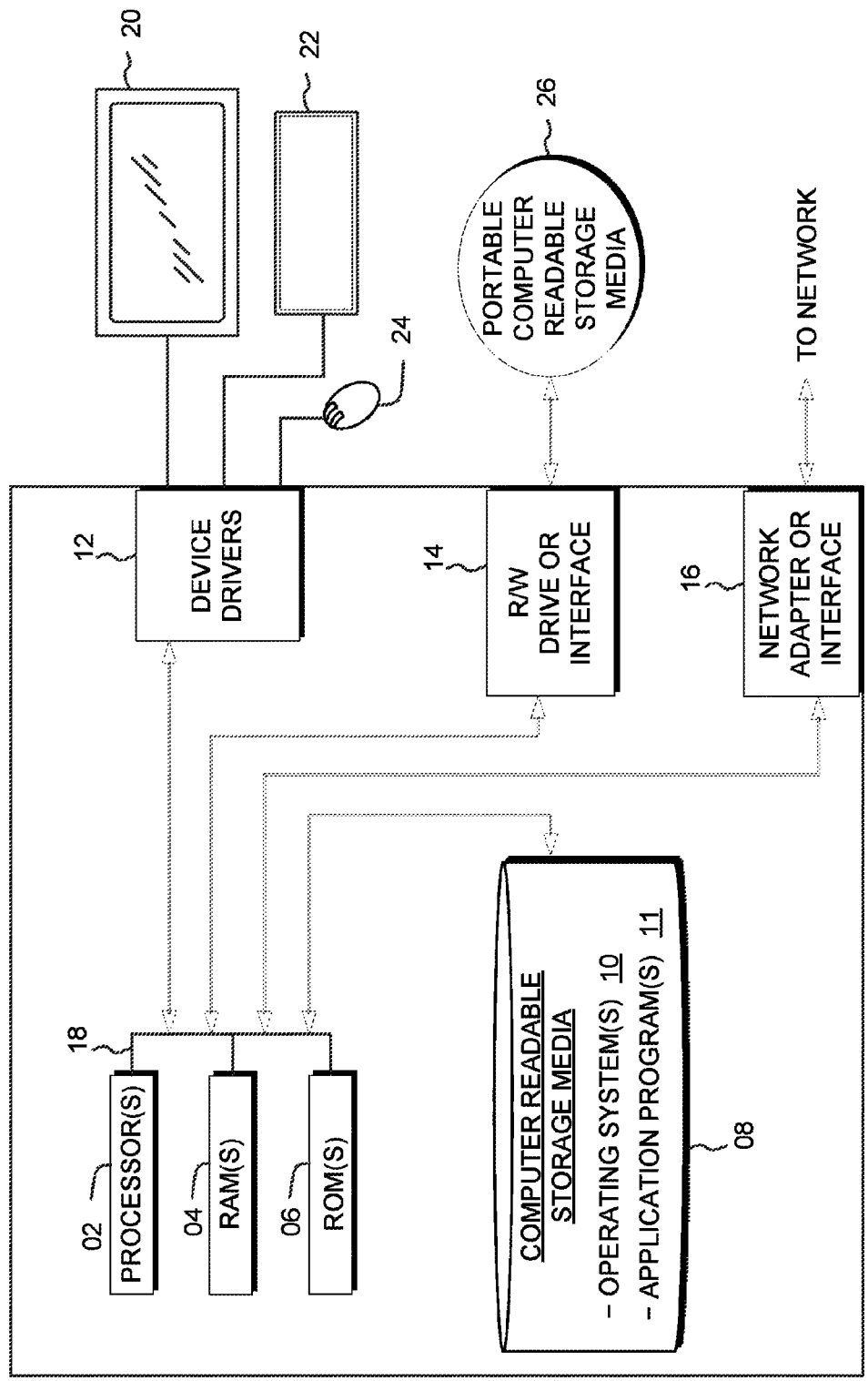
FIG. 3 is a diagram graphically illustrating the hardware components of the profile based navigation system of FIG. 1, in accordance with an embodiment of the invention.

FIG. 3 depicts a block diagram of components of computing device 110 of a profile based navigation system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example, PIA 134, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on computing device 110 may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on computing device 110 may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
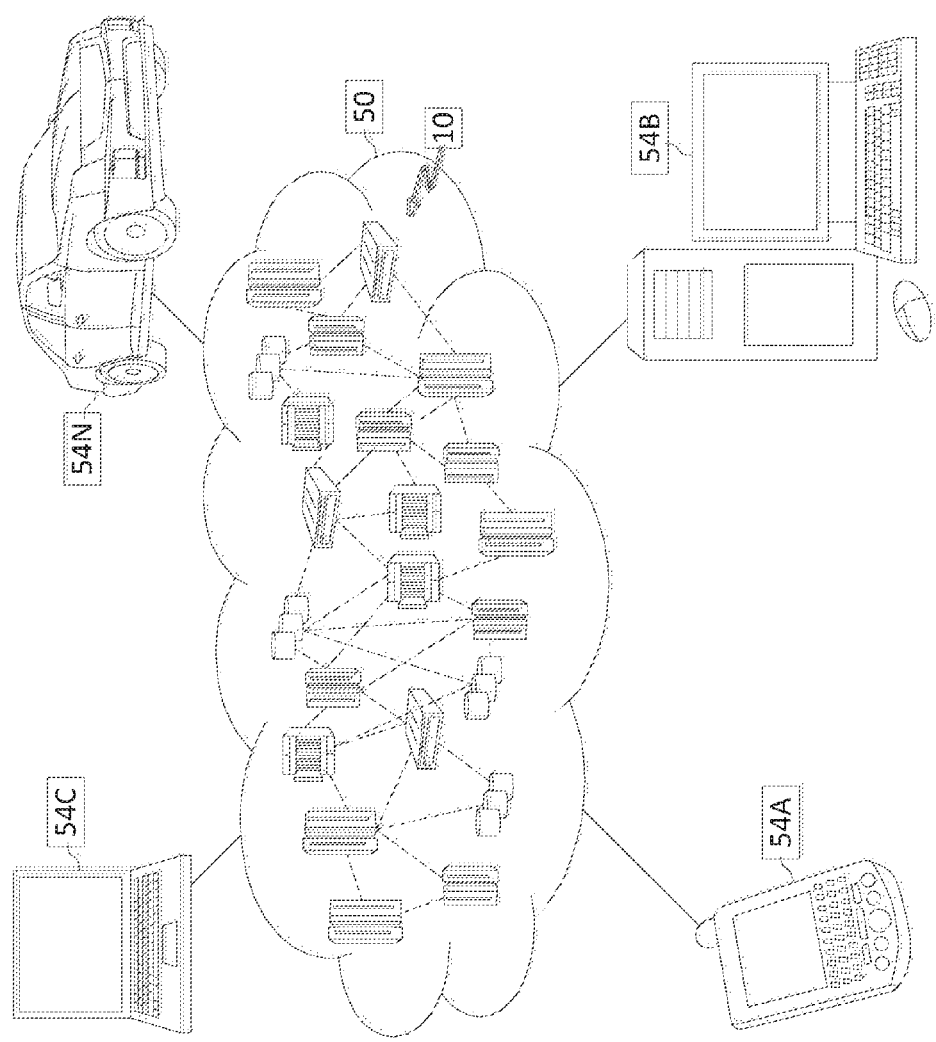
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
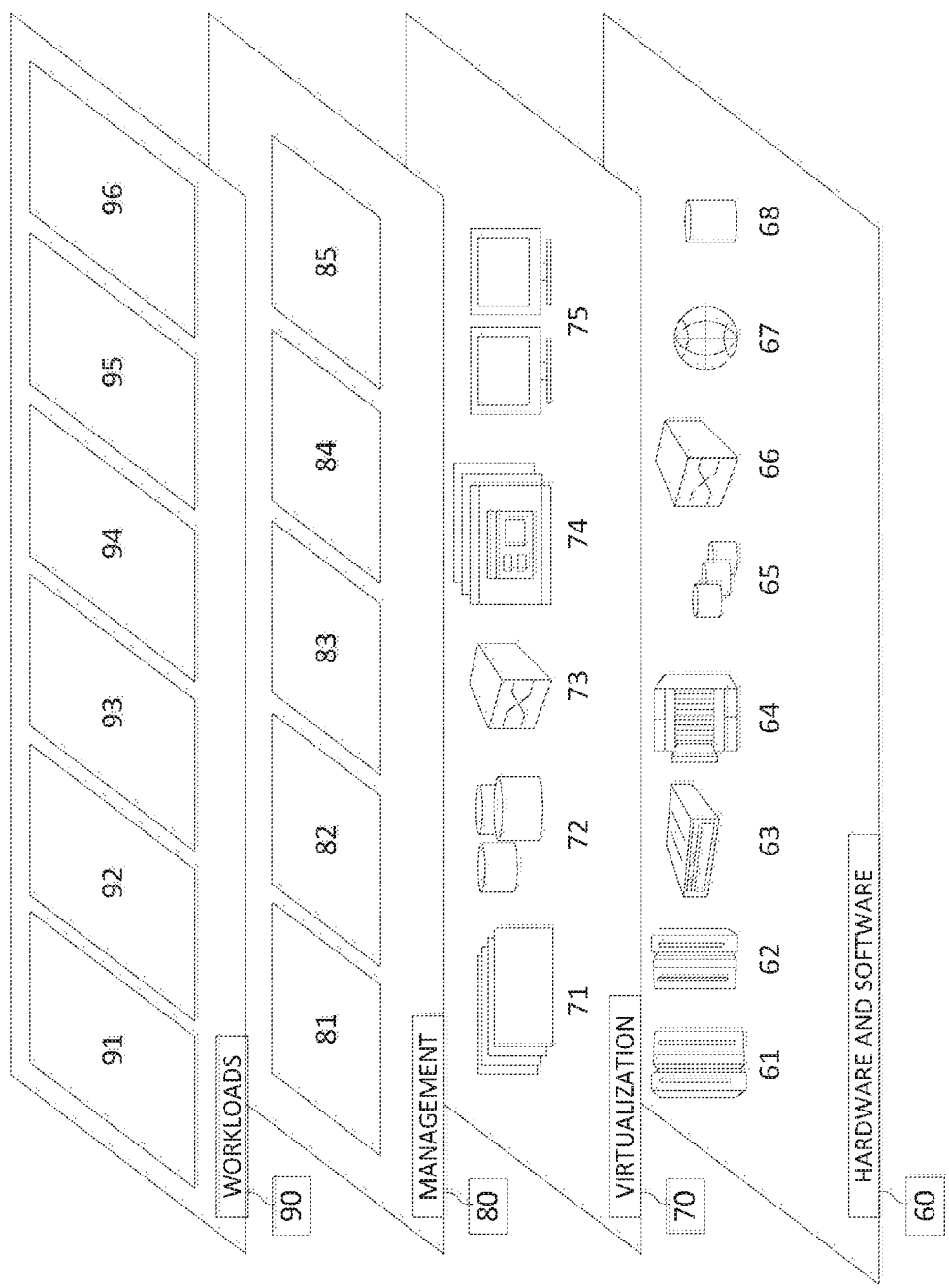
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and profile navigation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a profile based navigation system, the method comprising:
   identifying, by a computer, a social media network associated with a user;
   generating, by the computer, a navigation profile corresponding to the user based on the associated social media network, wherein the navigation profile details one or more user preferences and includes a user preference favorability that is generated by determining a favorability associated with one or more words within a threshold distance of the one or more user preferences and analyzing the one or more words in light of the favorability via natural language processing;
   receiving, by the computer, from the user a destination and a starting location;
   identifying, by the computer, one or more routes from the starting location to the destination;
   generating, by the computer, one or more route profiles corresponding to the one or more routes, wherein the one or more route profiles detail one or more route characteristics and includes a route characteristic favorability that is generated by determining a route characteristic favorability associated with the one or more routes based on reference to at least one of one or more databases and user input; and
   determining, by the computer, a route of the one or more routes having a smallest difference in value between the user preference favorability and the route characteristic favorability.

2. The method of claim 1, wherein the user preference favorability and the route characteristic favorability are weighted based on at least one of the favorability associated with the one or more words, the one or more databases, and the user input.

3. A computer program product for a profile based navigation system, the computer program product comprising:
   one or more computer-readable non-transitory storage media and program instructions stored on the one or more computer-readable storage media, the program instructions comprising:
   program instructions to identify a social media network associated with a user;
   program instructions to generate a navigation profile corresponding to the user based on the associated social media network, wherein the navigation profile details one or more user preferences and includes a user preference favorability that is generated by determining a favorability associated with one or more words within a threshold distance of the one or more user preferences and analyzing the one or more words in light of the favorability via natural language processing;
   program instructions to receive from the user a destination and a starting location;
   program instructions to identify one or more routes from the starting location to the destination;
   program instructions to generate one or more route profiles corresponding to the one or more routes, wherein the one or more route profiles detail one or more route characteristics and includes a route characteristic favorability that is generated by determining a route characteristic favorability associated with the one or more routes based on reference to at least one of one or more databases and user input; and
   program instructions to determine a route of the one or more routes having a smallest difference in value between the user preference favorability and the route characteristic favorability.

4. The computer program product of claim 3, wherein the user preference favorability and the route characteristic favorability are weighted based on at least one of the favorability associated with the one or more words, the one or more databases, and the user input.

5. A computer system for a profile based navigation system, the computer system comprising:
   one or more computer processors, one or more computer-readable storage media, and program instructions stored on one or more of the computer-readable storage media for execution by at least one of the one or more processors, the program instructions comprising:
   program instructions to identify a social media network associated with a user;
   program instructions to generate a navigation profile corresponding to the user based on the associated social media network, wherein the navigation profile details one or more user preferences and includes a user preference favorability that is generated by determining a favorability associated with one or more words within a threshold distance of the one or more user preferences and analyzing the one or more words in light of the favorability via natural language processing;
   program instructions to receive from the user a destination and a starting location;
   program instructions to identify one or more routes from the starting location to the destination;
   program instructions to generate one or more route profiles corresponding to the one or more routes, wherein the one or more route profiles detail one or more route characteristics and includes a route characteristic favorability that is generated by determining a route characteristic favorability associated with the one or more routes based on reference to at least one of one or more databases and user input; and
   program instructions to determine a route of the one or more routes having a smallest difference in value between the user preference favorability and the route characteristic favorability.

6. The computer system of claim 5, wherein the user preference favorability and the route characteristic favorability are weighted based on at least one of the favorability associated with the one or more words, the one or more databases, and the user input.

* * * * *